(No Model.)
J. GILGOUR.
NUT LOCK.
No. 277,706. Patented May 15, 1883.
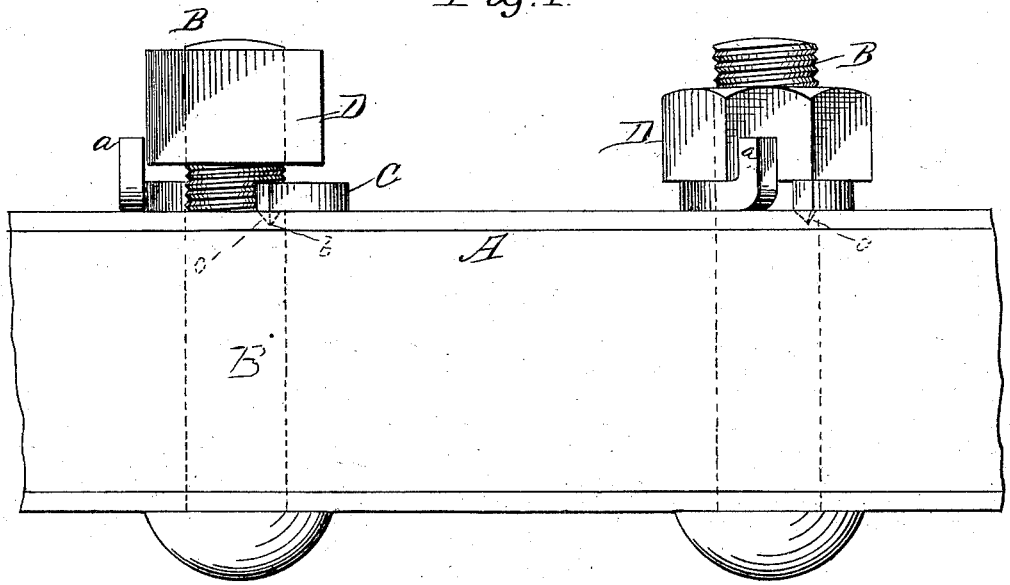
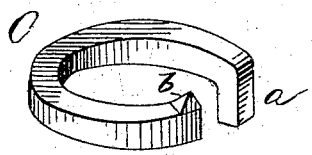
Witnesses:
C. W. Johnson
H. H. Taylor
Inventor:
John Gilgour
Attorney

UNITED STATES PATENT OFFICE.

JOHN GILGOUR, OF COLUMBUS, INDIANA.

NUT-LOCK.

SPECIFICATION forming part of Letters Patent No. 277,706, dated May 15, 1883.

Application filed March 19, 1883. (No model.)

*To all whom it may concern:*

Be it known that I, JOHN GILGOUR, a citizen of the United States of America, residing at Columbus, in the county of Bartholomew and State of Indiana, have invented certain new and useful Improvements in Nut-Locks; and I do hereby declare the following to be a full, clear, and exact description of the invention, such as will enable others skilled in the art to which it appertains to make and use the same, reference being had to the accompany drawings, and to letters or figures of reference marked thereon, which form a part of this specification.

This invention relates to an improvement in devices for locking nuts; and it consists of a small metallic rod, which is bent into shape and is provided at one end, on the under side of the bar, with a pointed projection or heel, and at its opposite end with an upwardly-bent projection, which overlaps the edge of the nut, as will be hereinafter more fully set forth, and pointed out in the claim.

In the annexed drawings, which illustrate my invention, Figure 1 is a side elevation of my invention, showing the same applied to nuts of different construction; and Fig. 2 is a perspective view of the nut-lock detached.

A represents the fish-bar plate or other device which it is desired to unite by means of bolts.

B represents the bolt, and C the washer or nut-lock, and D a nut which may be either square or hexagonal in shape. The washer C may be made of malleable iron or steel, and it consists of a rectangular bar, which is bent into the shape of an open ring, which is somewhat larger than the bolt upon which it is to be placed. One end of this open washer is slightly longer than the other, which longest end is provided with an upwardly-projecting portion, *a*, the opposite end being provided with a pointed projection or heel, *b*, which is placed in a depression provided for the same adjacent to the bolt-hole of the fish-bar when the same is of metal, as shown at *c*. When the plate adjacent to the washer C is not of metal this pointed heel will be forced into the same when the nut is screwed home, and will prevent the washer from turning. After the nut is screwed home the longer end of the washer C, having the projecting lug or arm *a*, is turned upon the point *b*, so that it will overlap the side of the nut and will hold the same securely in place and prevent it from being turned in an opposite direction or unscrewed; and it is evident that when this projecting arm overlaps the side of the nut all efforts to unscrew the nut will only tend to tighten the washer upon the same. To loosen said nut it will be necessary to turn said washer outwardly away from the bolt, so that its projecting end *a* will not engage with the nut.

By the means hereinbefore described I provide a cheap and effective means which may be readily used upon the fish-plate or connecting-bars of railway-rails, bridges, &c., which will prevent the nut from being loosened.

Said washers may be cheaply manufactured and applied to bolts of ordinary construction.

Thus having described my invention, what I claim as new, and desire to secure by Letters Patent, is—

In combination with a bolt and nut, a washer having a projection, *b*, and an upturned end, *a*, the diameter of the aperture and the washer being enough larger than the diameter of the bolt to permit the upturned end to be turned into and out of the path of the nut.

In testimony whereof I affix my signature in presence of two witnesses.

JOHN GILGOUR.

Witnesses:
FRANCIS STEWART,
WILLIAM MARMION.